United States Patent [19]

Ishibashi et al.

[11] 4,096,570

[45] Jun. 20, 1978

[54] SUBCHANNEL MEMORY ACCESS CONTROL SYSTEM

[75] Inventors: Masamichi Ishibashi; Shigeru Miyajima, both of Tokyo, Japan

[73] Assignee: Fujitsu Limited, Kawasaki, Japan

[21] Appl. No.: 644,508

[22] Filed: Dec. 29, 1975

[30] Foreign Application Priority Data

Dec. 29, 1974 Japan .................................. 50-777

[51] Int. Cl.² .......................... G06F 3/04; G06F 13/00
[52] U.S. Cl. ..................................................... 364/200
[58] Field of Search ........................ 340/172.5; 364/200 MS File, 900 MS File

[56] References Cited

U.S. PATENT DOCUMENTS

| | | | |
|---|---|---|---|
| 3,408,632 | 10/1968 | Hauck | 340/172.5 |
| 3,526,878 | 9/1970 | Bennett et al. | 340/172.5 |
| 3,573,741 | 4/1971 | Gavril | 340/172.5 |
| 3,618,031 | 11/1971 | Kennedy et al. | 340/172.5 |
| 3,665,404 | 5/1972 | Werner | 340/172.5 |
| 3,665,415 | 5/1972 | Beard et al. | 340/172.5 |
| 3,699,525 | 10/1972 | Klavins | 340/172.5 |
| 3,909,799 | 9/1975 | Recks et al. | 340/172.5 |
| 3,925,766 | 12/1975 | Bardotti et al. | 340/172.5 |
| 3,949,380 | 4/1976 | Barbour et al. | 340/172.5 |

*Primary Examiner*—Melvin B. Chapnick

*Attorney, Agent, or Firm*—Staas & Halsey

[57] ABSTRACT

A subchannel memory access control system for use in a data processing system having multiplexor channels to which input/output control units of a first group are connected, and block multiplexor channels to which input/output control units of second and third groups are connected. A plurality of input/output devices of corresponding groups are connected to each control unit. The subchannel memory comprises unit control word memory domains corresponding on a one-to-one basis to the input/output devices of the first group; a pool of unit control word memory domains for use by each operational input/output device connected to an input/output control unit of the second group, to be unshared and dedicated to its respective input/output device; unit control word memory domains of the third group corresponding on a one-to-one basis to each of the input/output control units of the third group, each unit control word memory domain to be shared or utilized in common by the plurality of input/output devices controlled by its respective input/output control unit of the third group; and an assign table memory domain for storing address information to access the respective unit control word memory domains of the second and third groups.

10 Claims, 12 Drawing Figures

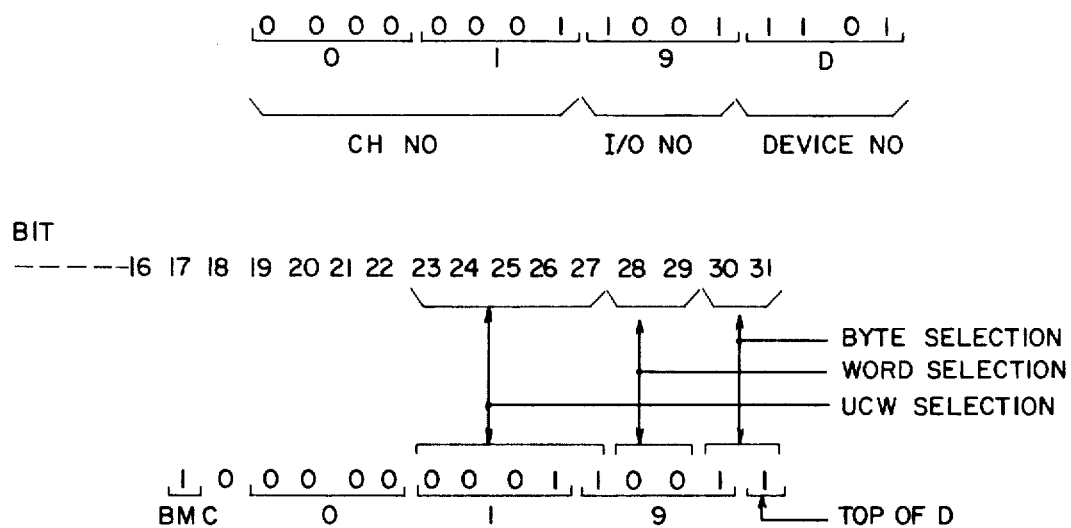
FIG. 3
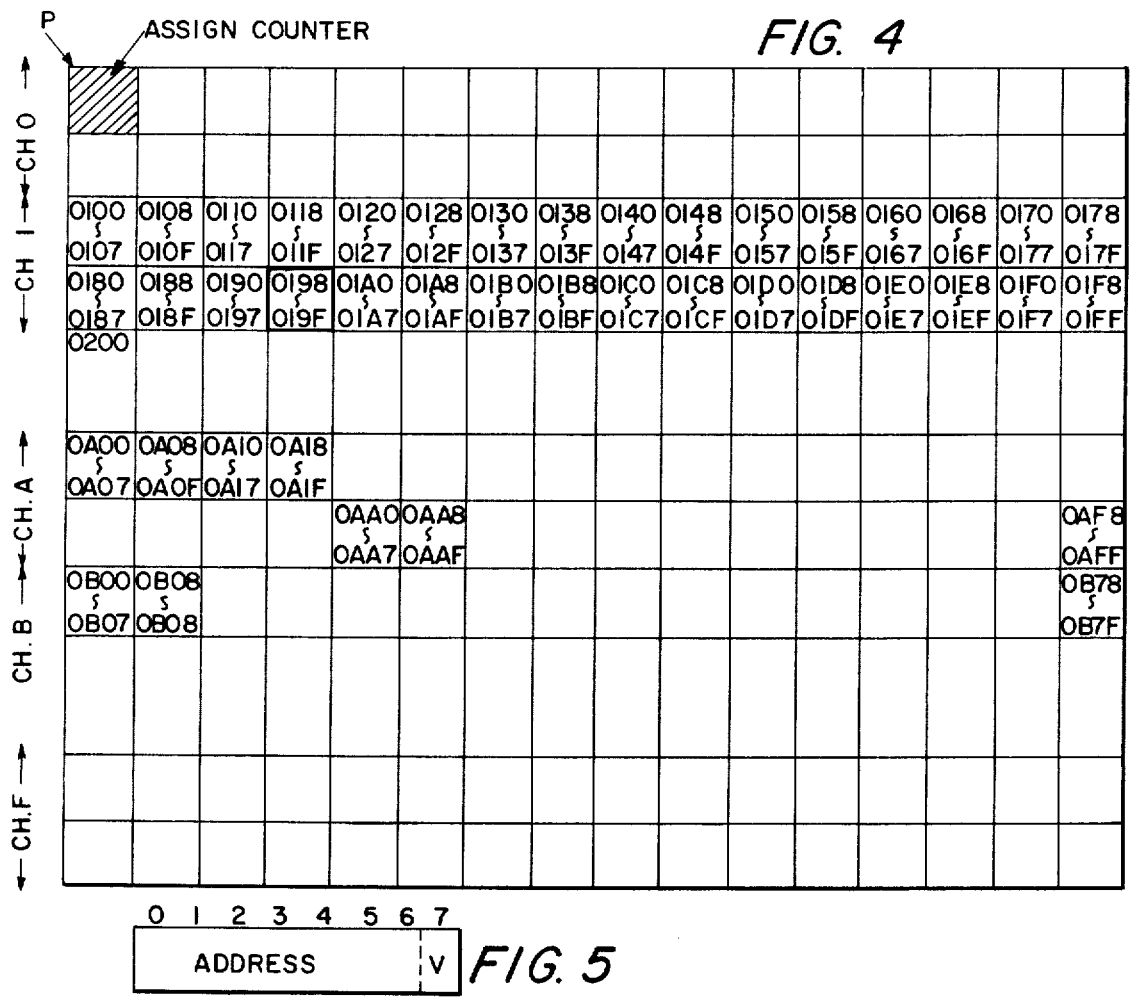
FIG. 4
FIG. 5

FIG. 8

|  | HEXA DECIMAL | CH-NO | I/O NO | ADDRESS |
|---|---|---|---|---|
| 0 | A A | 1 0 1 0 | 1 0 1 0 | 0 0 0 0 0 |
| 1 | 5 1 | 0 1 0 1 | 0 0 0 1 | 0 0 0 0 1 |
| 2 | 0 1 | 0 0 0 0 | 0 0 0 1 | 0 0 0 1 0 |
| 3 | 0 8 | 0 0 0 0 | 1 0 0 0 | 0 0 0 1 1 |
| 4 | 1 6 | 0 0 0 1 | 0 1 1 0 | 0 0 1 0 0 |
| 5 | 1 7 | 0 0 0 1 | 0 1 1 1 | 0 0 1 0 1 |
| 6 | 2 8 | 0 0 1 0 | 1 0 0 0 | 0 0 1 1 0 |
| 7 | 2 9 | 0 0 1 0 | 1 0 0 1 | 0 0 1 1 1 |
| 8 | 4 0 | 0 1 0 0 | 0 0 0 0 | 0 1 0 0 0 |
| 9 | 9 9 | 1 0 0 1 | 1 0 0 1 | 0 1 0 0 1 |
| 10 | A 2 | 1 0 1 0 | 0 0 1 0 | 0 1 0 1 0 |
| 11 | A 3 | 1 0 1 0 | 0 0 1 1 | 0 1 0 1 1 |
| 12 | A 4 | 1 0 1 0 | 0 1 0 0 | 0 1 1 0 0 |
| 13 | A 6 | 1 0 1 0 | 0 1 1 0 | 0 1 1 0 1 |
| 14 | A 8 | 1 0 1 0 | 1 0 0 0 | 0 1 1 1 0 |
| 15 | B F | 1 0 1 1 | 1 1 1 1 | 0 1 1 1 1 |

NO. 0  AA(16)

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| 0 | 0 | 0 | 0 | 1 | 0 | 0 | 1 | 0 | 0 | 0 | 0 | 0 | 0 | 0 | 1 |

NO. 13  A6(16)

| 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|
| 0 | 0 | 0 | 0 | 1 | 0 | 1 | 1 | 0 | 0 | 0 | 0 | 1 | 0 | 1 | 1 |

SUBCHANNEL MEMORY ACCESS CONTROL SYSTEM

BACKGROUND OF THE INVENTION

1. Field of the Invention

The present invention relates to a subchannel memory access control system in a data processing system having at least one block multiplexor channel connected to at least one input/output (I/O) control unit of a first type which controls, in parallel and on a time-shared basis, a plurality of input/output devices, and at least one other block multiplexor channel connected to at least one input/output control unit of a second type which controls another plurality of input/output devices on a non-time shared basis wherein only one control unit is operated at a time. Unit control word (UCW) memory domains (i.e., areas within the subchannel memory for storing unit control words) are pooled for use, on an unshared basis, by operational input/output devices of the first mentioned type of input/output control unit, while the input/output devices controlled by the second mentioned type of input/output control unit use in common or share the unit control word memory domains provided on a one-to-one basis with respect to each second mentioned type of input/output control unit. Furthermore, access to both unshared and shared unit control word memory domains is achieved by use of information stored in a separately provided assign table memory domain (i.e., an area within the subchannel memory in which is stored a table defining which UCW memory domain is assigned to which I/O control unit).

Generally, an input/output device is controlled by an input/output control unit, while the input/output control unit is controlled by a central processing unit (CPU) via a channel unit. In the central processing unit, predetermined processing is performed by using the unit control word of the main memory for respective operation requests from each input/output device and for an operation request from the central processing unit to the input/output device under the control of a program in the CPU.

2. Description of the Prior Art

Conventionally, memory domains for a unit control word have been provided one-to-one correspondence with the number of input/output devices. For example, when it is desired that each input/output control unit be capable of connection to as many as $m$ input/output devices, each channel unit can be connected with as many as $n$ input/output control units and a total of $k$ channel units can be connected to make up a whole system. Therefore, $k \times m \times n$ memory domains (this is called the subchannel memory) for storing said unit control words have to be provided. In practice, however, there is no case where the input/output devices numbering $k \times m \times n$ are all connected to the system and ready for use at the same time. The $n$ input/output control units are rarely respectively connected to every channel unit even if a total of $k$ channel units are connected to the system. In some cases, $n$ input/output control units are connected to specific channels. However, even in those cases, less than $n$ input/output control units are connected to the other channels. Also, $m$ input/output devices are rarely connected to every one of the $n$ input/output control units. Generally, of the input/output devices, less than half of the $k \times m \times n$ devices are ever connected at any one time. Therefore, it will be sufficient for the subchannel memory to reserve the memory domains for unit control words to, at most, half of $k \times m \times n$.

In general, however, each input/output device accesses a unit control word of the UCW memory domain according to the device number assigned to the I/O device. The device number consists of the corresponding channel number (0 to $k-1$), input/output control number (0 to $n-1$), and the input/output device number (0 to $m-1$). It is to be noted that the device number will be skipped when devices less in number than that maximum number allowed according to the specification are connected to the system. On the other hand, it is desirable, and even necessary, that the memory domain used for providing the unit control words for subchannel memory be continuous. That is to say, if a device number is skipped, and thus the corresponding address in the UCW memory is skipped, the usage of the UCW memory domains will be discontinuous, deteriorating the utilization and access efficiency of the memory. Moreover, the channel units and the input/output control units can respectively be classified into several types. For instance, channel units can be classified into a byte multiplexor channel (hereinafter referred to as multiplexor channel, MXC) and a block multiplexor channel (BMC). For the multiplexor channel unit (MXC), each time the channel performs a data transfer for one byte, it is disconnected from the interface in order to check to see if another channel unit is issuing a request for data transfer. If such a request is not issued, the relevant channel unit continues the data transfer of the next byte. In the case of the BMC, the data transfer is controlled for every block (several tens to several hundred bytes) in the same manner as mentioned above.

The input/output control units can be classified into those (hereinafter referred to as the input/output control unit of the 1st group) which are connected to the multiplexor channel MXC and control the input/output devices having comparatively low speed operation such as card readers, card punchers, and line printers, etc.; those (hereinafter referred to as the input/output control unit of the 2nd group) which are connected to the block multiplexor channel BMC and control the input/output devices having comparatively high speed operation such as magnetic disk units, magnetic drum units, etc. in which the same device operates for, at most, only a few blocks at a time; and those (hereinafter referred to as the input/output control unit of the 3rd group) which are also connected to the block multiplexor channel BMC and control the input/output devices such as magnetic tape units in which the same device often operates for several hundred blocks successively.

There is no need to provide a unit control word (UCW) domain for each input/output device of an input/output control unit of the 3rd group, since it will be sufficient to provide them as corresponding to each input/output control unit. However, in the case where the input/output control unit is of the 2nd group, it is inconvenient to provide only one unit control word domain corresponding to each input/output control unit, since two or more input/output devices are controlled in some cases on a time sharing basis and data transfer is performed one block at a time; thus two or more devices are virtually operated in parallel for several blocks. Therefore, for control units and related devices of the second group, it is desirable to provide a pool of UCW domains for selective use by those devices in operation with control units of the second group.

SUMMARY OF THE INVENTION

The purpose of the present invention lies in solving the above problems by providing a pool of unshared unit control word domains on the basis of one for each input/output device operational with an input/output control unit of the 2nd group, while providing shared UCW domains on the basis of one for each control unit of the 3rd group. Furthermore, special address conversion means for both shared and unshared UCW domains is provided so that each input/output device can use each domain effectively.

On the other hand, for the input/output control units of the 1st group, it is not always effective to provide a pool of unit control word domains as in the case of the 2nd group. This is due to the fact that control of the input/output devices is carried out in units of bytes by the input/output control units of the 1st group. In such a case, the application frequency becomes high, since a unit control word is used for processing each byte. Therefore, it is convenient for control that, in general, a unit control word domain be provided in correspondence to each input/output device. Moreover, in the ordinary system, the input/output devices of such number as approximately $m \times n$ are often directly connected to the multiplexor channel.

The subchannel memory access control system of the present invention operates in a data processing system having a multiplexor channel to which input/output control units of a 1st group are connected, and a block multiplexor channel to which input/output control units of 2nd and 3rd groups are connected. The subchannel memory comprises a unit control word memory domain for the 1st group of control units and provided on a one-to-one basis to the input/output devices of the 1st group; a pool of unshared unit control word memory domain for the 2nd group of control units provided for use, on an unshared basis, by operational devices of the input/output control units of the 2nd group, and thus selectively utilized by the input/output control units of the 2nd group; shared unit control word memory domains of the 3rd group which are provided on a one-to-one basis corresponding to the input/output control units of the 3rd group and provided in common to a plural number of input/output devices to be controlled by each input/output control unit of the 3rd group; and an assign table memory domain for storing the address information to access the respective unit control word memory domains of the 2nd and 3rd groups. The subchannel memory is characterized by the fact that access is made to the assign table memory domain on the basis of a device number given to each input/output device making access to each of the unit control word memory domains of said 2nd and 3rd groups. Control is so performed that the access is made to said unit control word memory domain by means of the read out information and a part of said device number. The stored address of a unit control word memory domain of said 2nd group is distinguished from a unit control word memory domain of said 3rd group, by the information mentioned above being stored in the assign table memory domain, through the configuration thereof.

BRIEF DESCRIPTION OF THE DRAWINGS

FIG. 3 shows a profile of an embodiment of the assign table read out processing;

FIG. 4 shows a configuration of an embodiment of the assign table memory domain;

FIG. 5 indicates the contents of the byte stored in the assign table memory domain;

FIG. 8 shows a diagram indicating the contents of 2 bytes to be stored in the assign table memory domain indicating the access to the unit control word memory domain of the third group;

DETAILED DESCRIPTION OF THE INVENTION

Figure 1:
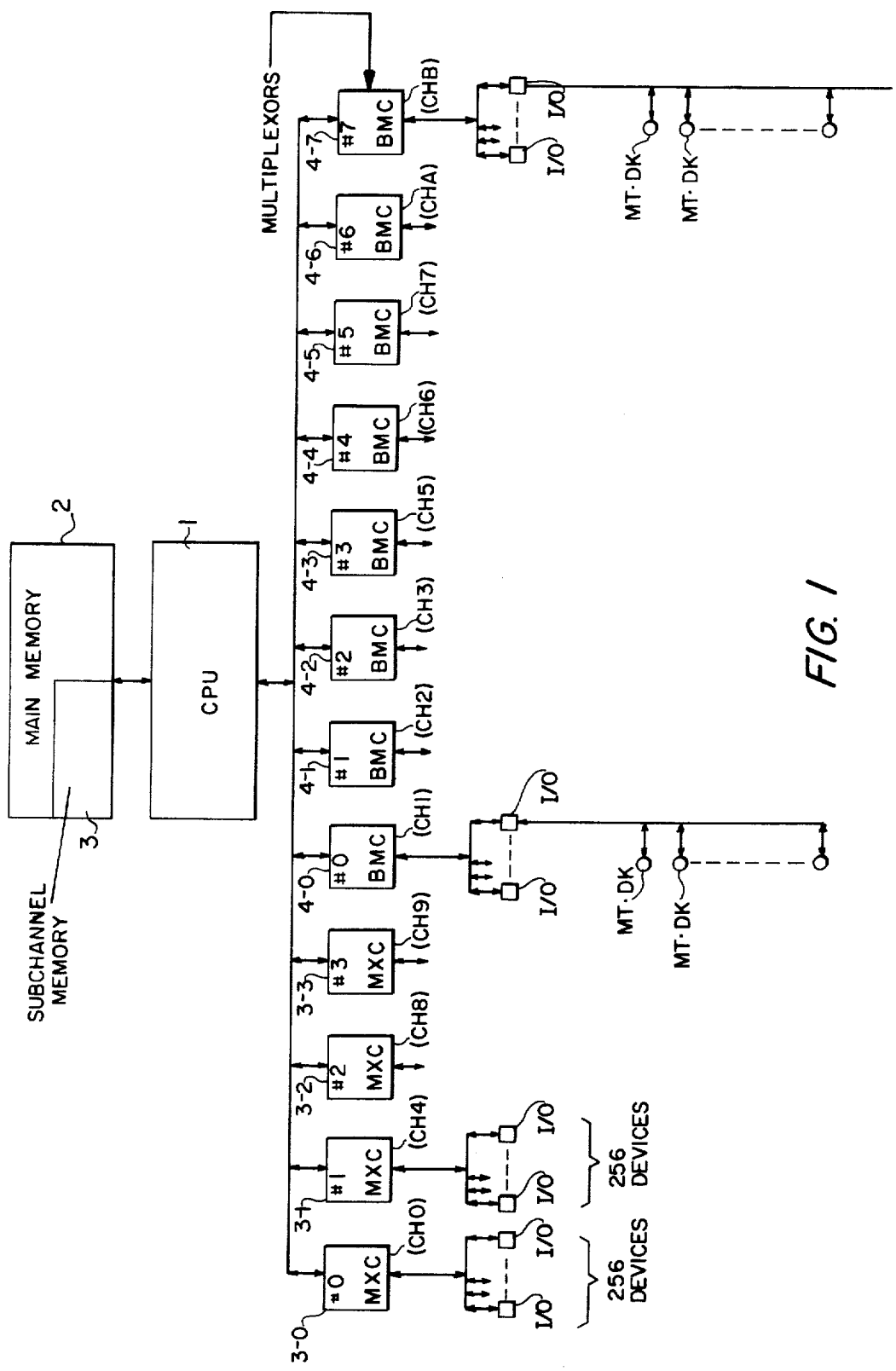
FIG. 1 shows an example of the data processing system wherein the subchannel memory access control system of the present invention is employed.

The data processing system shown in FIG. 1 shows a configuration of largest possible capacity. In FIG. 1, numeral 1 denotes a central processing unit CPU; 2 indicates a main memory; 3 indicates a subchannel memory; 3-0 to 3-3 indicate multiplexor channels; 4-0 to 4-7 indicate block multiplexor channels; the designation I/O indicates, in each occurrence, an input/output control unit; MT and DK indicate input/output devices such as a magnetic tape unit and a magnetic disk unit in each respective occurrence.

Up to 4 multiplexor channels MXC are used in the FIG. 1 embodiment, and each has respectively connected thereto a maximum of 16 input/output control units. The input/output control units connected to the multiplexor channels form a first group. Each input-/output control unit has connected thereto a maximum of 16 input/output devices. Therefore, a total of 256 devices are shown connected to each multiplexor channel, and a total of 256 unit control word memory domains are reserved in the subchannel memory 3, corresponding to each input/output device connected to a respective subchannel. On the other hand, up to 12 block multiplexor channels BMC are used, and each has respectively connected thereto up to 16 input/output control units. Thus, a total of 256 input/output devices can be connected to each block multiplexor channel BMC. The input/output control units connected to the block multiplexor channels are classified into second and third groups. For the input/output control units of the second group, a pool of unshared unit control word memory domains is provided, so that each memory domain can be used in the order in which it appears by a respective I/O device on an "unshared" basis. For the input/output control units of the third group, an individual unit control word memory domain is reserved on a one to one basis with respect to the corresponding input/output control units. However, when several input/output devices of the third group are controlled by a common input/output control unit, those several input/output devices commonly use the individual memory domain on a "shared" basis.

When controlling an input/output device with an input/output output control unit, the subchannel memory 3 is accessed via the multiplexor channel MXC or block multiplexor channel BMC, and control processing is performed by reading out the appropriate unit control word from the corresponding unit control word memory domain in the subchannel memory 3.

Figure 2:
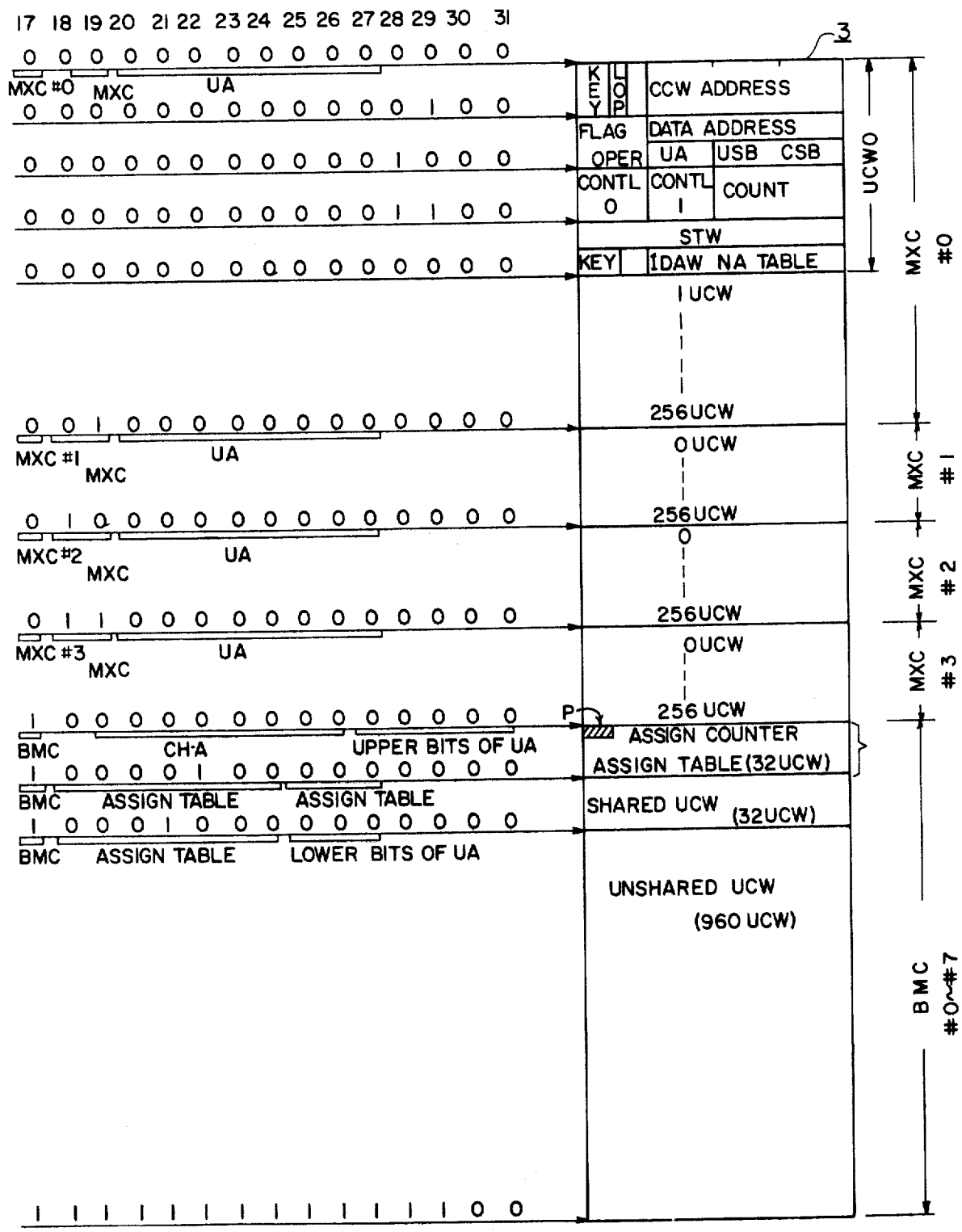
FIG. 2 is a diagram showing the assignment of unit control word memory domains in the subchannel memory of the present invention.

FIG. 2 shows a profile of assignment of each unit control word memory domain in said subchannel memory 3. In this figure, 3 denotes the subchannel memory; MXC #0 to MXC #3 indicate domains corresponding to respective multiplexor channels 3-0 to 3-3, shown in FIG. 1; BMC #0 to #7 indicate domains corresponding to block multiplexor channels 4-0 to 4-7; UCW indicates a unit control word memory domain at each occurrence; KEY, LOP, CCW Address, etc., each indicate a control word being stored in the corresponding unit control memory domain by which an input/output device is controlled when the control word is read out. The normal English meaning of the individual control words has no direct relation to the present invention. In the figure, the domains MCX #10 to MXC #3 correspond to the unit control word memory domain of the first group, "UNSHARED UCW" corresponds to the unit control word memory domains of the second group mentioned in the present invention, and "SHARED UCW" correponds to the unit control word memory domain of the third group of the present invention, respectively. Moreover, "ASSIGN TABLE" corresponds to the assign table memory domain in which the address information is received for accessing the unit control word memory domains of the second and third groups. The bit train shown in the left side of the figure indicates the corresponding address in the subchannel memory 3. The designators shown in the lower side of the addresses roughly indicate the processing for relevant addresses, which will be mentioned later.

As shown in the figure, one unit control word memory domain (UCW) respectively consists of 16 bytes. The contents from the 20th bit to the 27th bit in the address information for the MXC domain is the device number of the corresponding input/output device to be connected to each multiplexor channel MXC. The 17th bit contains the information for distinguishing between multiplexor channel MXC and block multiplexor channel BMC, and the 18th and 19th bits contain information for distinguishing the multiplexor channels 3-0 and 3-3.

In expressing the address of the BMC domain, the device number of each input/output device is not directly used until after address conversion, by means of the address information being stored in the assign table domain. The accessing to each unit control word memory domain is described hereinafter by referring to FIGS. 2 and FIG. 3.

(I) Accessing the unit control word memory domain associated with the first group The unit control word memory domains involved in the first group are reserved to correspond on a one-to-one basis with the input/output device to be connected to the multiplexor channel MXC. For example, when it is desired that control is to be made of an input/output device having the device number of No. 8, connected to the input/output control unit No. 12, which is in turn connected to the #1 multiplexor channel 3-1, the address information for accessing the subchannel memory 3 is formed as shown below and access is made to the corresponding unit control word memory domain.

| 17 | 18 | 19 | 20 | 21 | 22 | 23 | 24 | 25 | 26 | 27 |
|---|---|---|---|---|---|---|---|---|---|---|
| 0 | 0 | 1 | 1 | 1 | 0 | 0 | 1 | 0 | 0 | 0 |
| MXC | #1 MXC | | Device No. "12" of control unit | | | | Device No. "8" | | | |

The 28th, 29th, 30th and 31st bits specify which byte in which word of the relevant unit control word memory domain is to be read out.

(II) Accessing the unit control word memory domain associated with the second group The unit control word memory domains involved in this group comprise a pool of unshared domains selectively and is used by respective ones of the several input/output control devices connected via their respective I/O control unit to the block multiplexor channel BMC. In other words, where one of the input/output control units of the second group has an operational input/output device one unit control word memory domain, associated with the second group is selectively utilized by the operational input/output device in accordance with the sequence of access of the devices to the subchannel memory 3.

In accessing the unit control word memory domain associated with the second group, access is first made to the assign table memory domain shown in FIG. 2 by using device data. Then, access is made to the desired unit control word memory domain in the second group by using the addressing information read out from that assign table memory domain. The operation during this process can be explained by referring to FIG. 3 through FIG. 6.

Below is an example of the control for the input/output device having the device data of "0000000110011101" as shown in FIG. 3. The upper 8 bits in this device data (00000001) correspond to the channel number (the channel number "1" corresponds to the block multiplexor channel 4-0 shown in FIG. 1); the next 4 bits (1001) correspond to the number of the input/output control unit (9); and the lower 4 bits (1101) correspond to the input/output device number or designation (D). Namely, each block multiplexor BMC has connected thereto a maximum of 16 input/output control units (designated 0-9, A-F), and each input/output control unit has connected thereto a maximum of 16 input/output devices (designated 0-9, A-F).

In the channel number, a total of 8 bits are used, but the upper 4 bits are always "0". The reason will be made clear by the explanation given later.

The above device data "0000000110011101" can be expressed as "019D" in hexadecimal notation. When accessing the assign table by using such device data, all but the rightmost three bits of the device data is shifted in from the right, and the 17th and 18th bits are forcibly occupied with "10". Thereby, address information of "1000000000110011" is generated at the 17th to 31st bits (see bottom line of FIG. 3). The "10" datum is forcibly set in the 17th and 18th bit because the specific device is associated with the block multiplexor channel BMC. In this case, a maximum of 16 devices are connected to one input/output control unit. However, these devices are grouped into two blocks of device numbers "0" to "7", and "8" to "F". Thus, the continuous eight unit control word memory domains are assigned to each group, respectively. Therefore, when generating the address information, only the uppermost bit of the device number is used, and access is made to the assign table memory domain shown in FIG. 2 by using the address information generated.

FIG. 4 shows an enlarged version of the assign table memory domain shown in FIG. 2. The address of the point P shown in FIG. 4 coincides with the point P in FIG. 2. The address generated in the manner as shown in FIG. 3 corresponds to the domain expressed by the block "0198 to 019F" in FIG. 4. The format of data being stored in the assign table is shown in FIG. 5. The contents of bit 0 to bit 6 in FIG. 5 are used for obtaining address information when access is made to the unit control word memory domain in accordance with contents of bit 18 to bit 24 in said address information. The contents of bit 0 to bit 6 in FIG. 5 are set so as to define one of the 120 addresses from "0001000" to "1111111" when access is made to the unit control word memory domain of the second group. The 7th bit in FIG. 5 represents the validity check information for the contents of the relevant assign table. When it is effective, this bit is occupied by "1".

Figure 6:
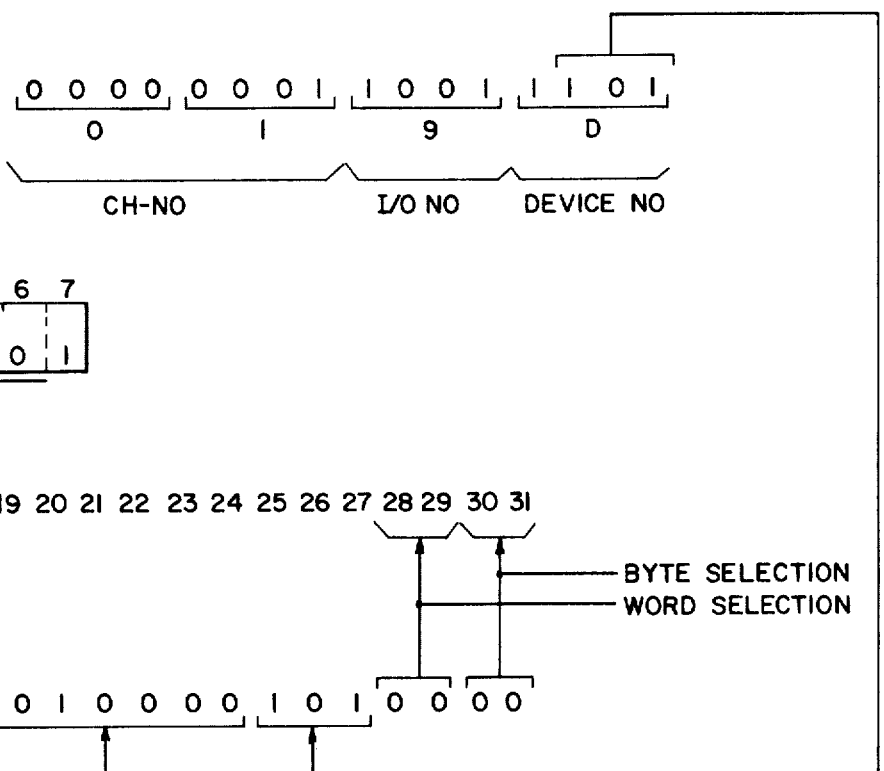
FIG. 6 shows a diagram for processing and accessing the unit control word memory domain of the second group mentioned in the present invention.

FIG. 6 shows a profile of a process for accessing the unit control word memory domain of the second group after the read out of said assign table. The figure shows that, as a result of indexing to the assign table as shown in FIG. 3 or FIG. 5 on the occasion of controlling the device having the device number of "019D" in hexadecimal notation, the contents of the unit control word memory domain are given by "00100001". In this case, as shown in FIG. 6, the 17th bit is occupied with "1" which indicates the block multiplexor channel BMC, the bits 18 to 24 are occupied with the contents of bits 0 to 6 of the assign table read out as mentioned above, while the bits 25 to 27 contain the lower three bits of the device number "D", and the bits 28 to 31 are occupied with a value determined according to which byte of which word of the relevant unit control word memory domain is to be accessed.

In other words, the unit control word memory domains corresponding to the total of 8 input/output devices having the device numbers 0 to 7 or 8 to F are always the domains of continuous 8 × 16 bytes (1 UCW - 16 bytes). However, precisely where the domain of 8 × 16 bytes falls in the pool of unshared domains (960 × 16 bytes) shown in FIG. 2 is determined by an instruction from the assign counter.

One of the features of the present invention lies in the fact that, by assigning the abovementioned domains of 8 × 16 bytes to the pool of unshared domains of 960 × 16 bytes in the sequence as they appear using this assign counter, the unit control word memory domains are automatically assigned to each input/output device when the system starts, irrespective of which input/output control units are respectively connected to which of the maximum of 960 input/output devices and irrespective of which block multiplexor channel is connected to which input/output control unit. When the entire system starts, all domains in the subchannel are cleared to "0" and the assign counter is set to "00010001". When a certain input/output device (this is the device determined to be used first by the system) is controlled, the domain to which the unit control word used for the abovementioned control is provided until the relevant control is completed (i.e., the UCW memory domain) is given by the following process. The following is an explanation of the unit control word domain associated with the second group. First, access is made to the assign table in the manner as explained in conjunction with FIG. 3. The domain being accessed is necessarily occupied with "0" only. Therefore, the content "00010001" of the assign counter at that time is written in the pertinent domain and at the same time the unit control word is saved in the unit control word domain using "00010001" in the same manner as explained for FIG. 6. Thereby, the assign counter is advanced one step and the content becomes "00010011". (The lowest bit is the validity indication bit and is occupied by "1" in this case.)

Similarly, access is made to the assign table in the same manner as explained for FIG. 3. When the content is all "0", the content of the assign counter at that time is written. Then, the content is used in such a manner as indicated in FIG. 6 and, at the same time, the assign counter is advanced. If it is determined that contents other than all "0" are found in the assign table as a result of access therefore in the manner as explained for FIG. 3, in connection with the control of a certain device, this indicates that the device has already been used and the unit control word domain has been previously assigned.

The assignment of the unit control word domain is performed in units of 8 input/output devices to save the capacity of the assign table and to allow it to perform the assignment freely and more precisely, for example, than for units of 4 or 2 input/output devices. It is also desirable because it increases the application efficiency of the unshared UCW domains.

(III) Accessing the unit control word memory domain involved in the third group

The unit control word memory domain involved in this group is associated with an input/output control unit I/O (FIG. 1) connected to the block multiplexor channel BMC and it is reserved on a one-to-one basis for the input/output control unit I/O of the third group to which a plural number of input/output devices are connected, which devices will never operate in parallel, or on a time-sharing basis.

In accessing, the unit control word memory domain of said third group, access is made first to the assign table memory domain as in the case of (II) above. Then, access is performed to the desired unit control word memory domain of the third group by means of the information read out from said table. The operation during this process can be explained by referring to FIGS. 3 through 5, 7 and 8.

A device having the device number "019D", in the hexadecimal notation, is controlled by accessing the unit control word memory domain of the third group. Accessing of made to the assign table domain by generating the address information in the same manner as explained for FIG. 3 in the case of (II) above. The information to be read out must be any of "0000000" to "0000111", except for the validity indication bit. Thereby, it is determined that the pertinent device is associated with the third group. In this case, therefore, the neighboring byte paired with the byte accessed is also read out. Where the device has a device number of "019D", access is first made to the byte of "0198 to 019F" in FIG. 4. When the content is equal to or smaller than "0000111", the byte paired with the pertinent byte, (i.e., the byte of "0190 to 0197") is also read out.

As mentioned above, by accessing the assign table according to the device number, the group (second group or third group) to which the device belongs is made clear. This is a unique and distinctive feature of the present invention.

Figure 7:
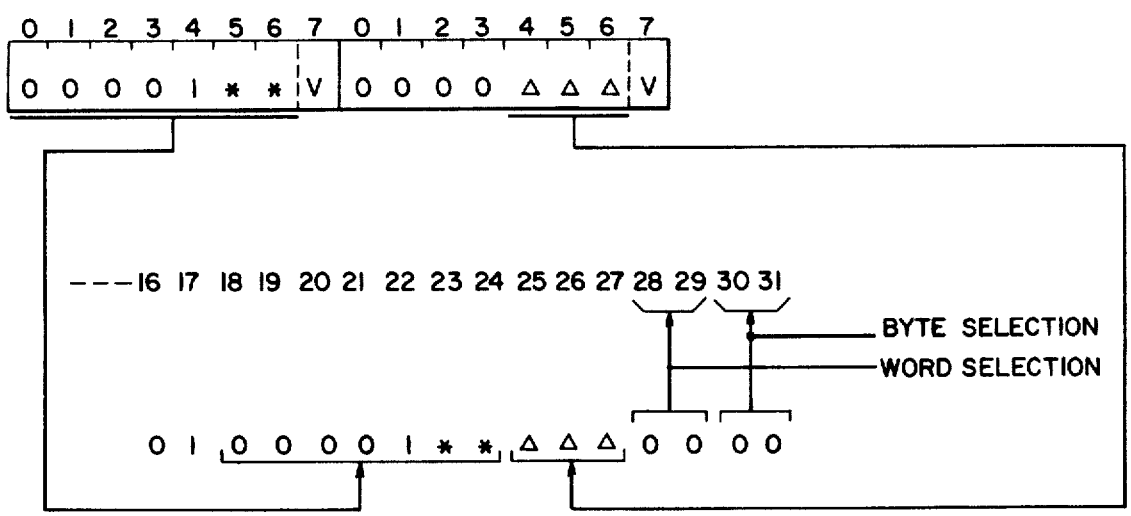
FIG. 7 shows a diagram for processing and accessing the unit control word memory domain of the third group mentioned in the present invention.

FIG. 7 shows a process for accessing the unit control word memory domain of the third group when the contents of 2 bytes read out are "00001V, 0000∆∆∆V". The character V in the above contents is the validity check information and  or ∆∆∆ will be described later in connection with FIG. 8.

In this case, as shown in FIG. 7, at the 17th bit, the datum "1" indicating the block multiplexor channel BMC is set; at the 18th to 24th bits, the contents "00001**" read out from the assign table are set; at the 25th to 27th bits, the contents "∆∆∆" read out from the assign table are set; and at the 28th to 31st bits, a value is set which determines to which byte and to which word, in the pertinent unit control word, access is to be made. It goes without saying that the address generated, as explained in FIG. 7 above, is used for accessing only one unit control word memory domain in the "shared UCW" in FIG. 2.

Of the contents of said assign table, the data "**∆∆∆" show the sequence of a predetermined assignment for the input/output control unit involved with the third group, and it can have only one value of the 32 values from "00000" to "11111". Therefore, the maximum number of unit control word memory domains associated with the third group is "32".

The unit control word domain of the third group is registered in the assign table in correspondence to the input/output control unit of the third group. In other words, as shown in the table of FIG. 8, the 32 input/output control units of the third group are each given a number as previously described in the form of the 5 binary bits. The upper 2 bits and lower 3 bits are respectively written in the continuous 2 bytes on the assign table (the address is determined by the channel number and the number of the input/output control unit). These operations are not performed automatically by providing the assign counter as in the case for the unit control word domain of the second group, but are performed by the management program at the starting time of the system. The reason for this is that, if the assignment of the unit control word domain is carried out for the third group using the assign counter, it is necessary to distinguish the device requesting the assignment as being in the second or third group. Therefore, it is easier to previously assign only those involved with the third group, according to the management program, etc. than it is to provide additional hardware or software for this purpose. The devices of the second and third groups can be distinguished when they are registered in the assign table by accessing the assign table as mentioned above.

Again, referring to FIG. 8 the device numbers "00000", "00001", "00010", ..., "01111" given sequentially to the input/output control unit are expressed as "AA", "51", "01", ..., "BF" by the hexadecimal notation for both the channel number and input/output control unit number. In the assign table to be indexed by the input/output control unit "AA", "00001001, 00000001" is stored, as shown in No. 0 of FIG. 8. The datum "∆∆∆" corresponds to the serial number "00000". Moreover, in the assign table to be indexed by the input/output control unit "A6" which is given the serial number of 13, "00001011, 00001011" is being stored. In this case, the datum "∆∆∆" corresponds to the serial number "01101". One unit control word memory domain of the third group corresponds on a one-to-one basis to the input/output control unit associated with the third group.

When one among the plural number of input/output devices to be connected to the input/output control unit associated with the third group is to be controlled, the unit control word memory domain corresponding to the pertinent input/output control unit is used for controlling that one input/output device. When the controlling comes to an end, it is released. When another input/output device connected to the same control unit I/O is succeedingly controlled, said unit control word memory domain corresponding to that same I/O control unit is used for controlling the other pertinent input/output device.

Figure 9:
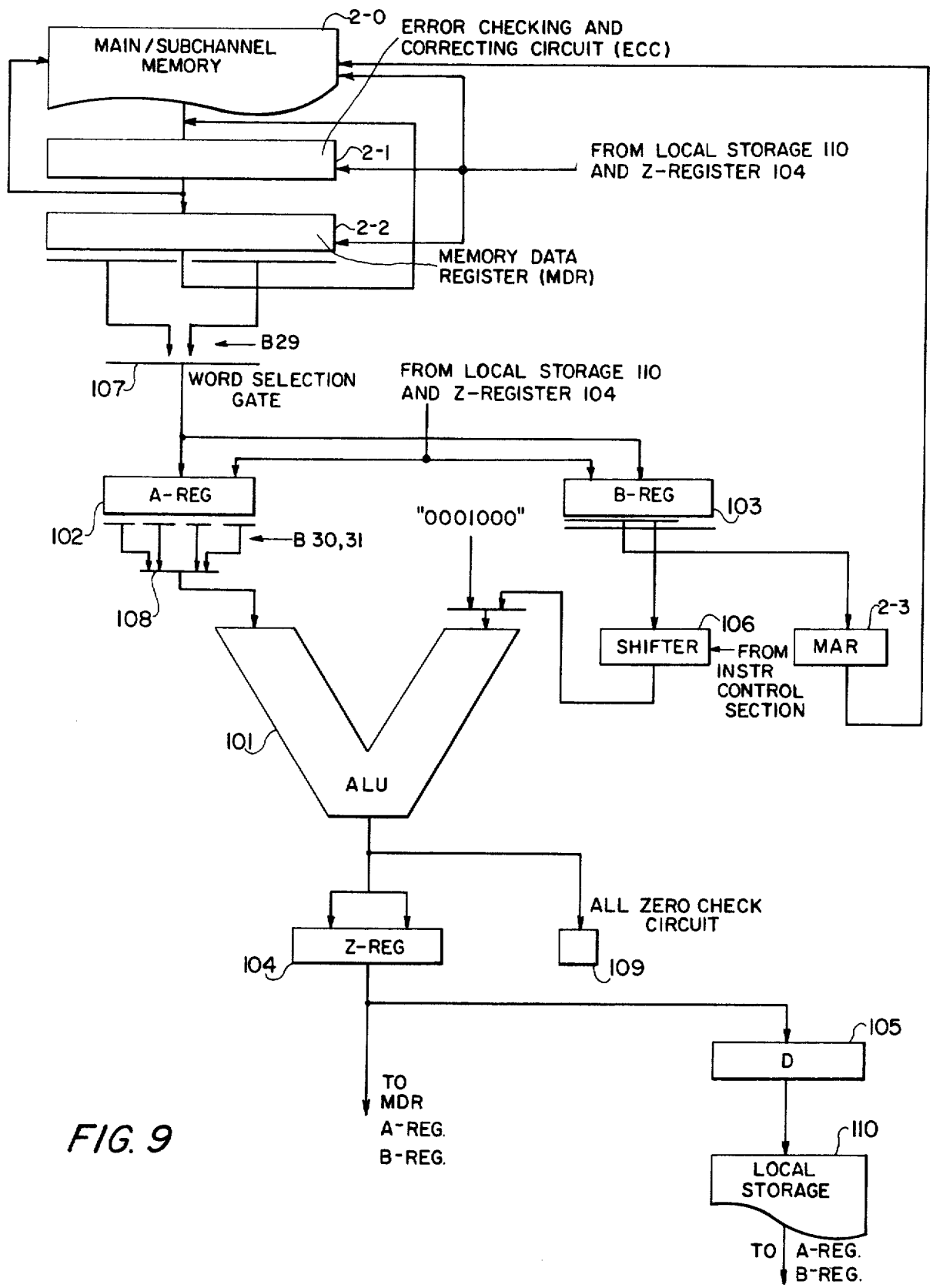
FIG. 9 is a circuit diagram of the present invention.

FIG. 9 shows an embodiment for carrying out the present invention. In correlating this figure, with the system configuration shown in FIG. 1, a portion of the central processing unit CPU shown by 1, the main memory shown by 2, and the subchannel memory shown by 3 are combined in FIG. 9 and are shown as Main/Subchannel MEMORY 2-0. In FIG. 9, 2-0 denotes the memory; 2-1 an ECC (Error Checking and Correcting) circuit; 2-2, a memory data register MDR; 2-3, a memory address register MAR. Blocks 2-1, 2-2 and 2-3 are all part of the memory 2-0. In addition, 101 denotes an Arithmetic Logical Unit ALU; 102, an A-register; 103, a B-register; 104, a Z-register; 105, a D-register; 106, a shifter SHFT; 107, a word selection gate; 108, a byte selection gate; 109, an all "0" check circuit and 110, a local storage LS.

The operation of the multiplexor channel MXC is discussed as follows. For illustration, assume that data of 50 bytes are transferred to a certain device, for example, a card puncher, and that those data are punched onto successive cards of a deck of 50 cards. When the device number, I/O control unit number and channel number of that card puncher are assigned on the operational program being used, they are set in the B-register in the form shown in the upper part of FIG. 3. On the other hand, other various pieces of information are also required for practical data transfer, such as an address in the memory 2 wherein the data of 50 bytes to be punched and its data format are stored. These pieces of information are provided to the local storage 110 and partly sent to the proper MXC channel. The memory at first sends the data of 1 byte allowing that data to be punched on a a card. The time taken for transfer of 1 byte is considerably shorter than the time taken by the card puncher to punch the data onto the card. Therefore, upon transfer of 1 byte to this channel, it is possible to transfer data to other channels during the time the card puncher is punching. The CPU thus sends the various pieces of information gathered at the local storage 110 (this is used as the unit control word) to the A-register 102 in FIG. 9. The data is then converted into the predetermined format (similar to the UCW in FIG. 2) by the ALU 101 and is sent to MDR 2-2 via Z-register 104. In addition, the data is subjected to an error check procedure at the ECC circuit 2-1 and in also saved in the unit control word domain of the subchannel memory according to the address previously set in the B-register 103. Thereafter, control is transferred to the other channel and the processing is performed in the same manner as described above. When the data transfer of byte units is completed for several channels, as mentioned previously, a signal is sent to the CPU via the channel informing the CPU that the punching of the data of the first 1 byte has been completed by the card puncher; the device number of said card puncher is then set again in accordance with the contents of the B-register 103. Contents of the B-register 103 are not shifted at the shifter 106 and then provided as input to the ALU 101, in this case, since the MXC channel is being used (this is known from the channel device number). Moreover, at the ALU 101, "0" is added to the 17th bit as shown in and explained with respect to FIG. 2. Then, the address corresponding to the desired data is given to the 28th to 31st bits and the result is returned again to B-register 103 via the Z-register 104. During the next processing step, the data is then sent to MAR 2-3 in order to access the subchannel. Thus, the desired unit control word UCW is obtained at MDR 2-2 and stored in the local storage 110 via A-register 102, ALU 101, Z-register 104 and D-register 105. Thereafter, the data transfer of the next 1 byte is carried out. The succeeding operations are performed in the same manner as above.

The following is directed to the block multiplexor BMC channels. In this case, the operation is almost the same as above, except that the operation of the channel is not performed by the data transfer in byte units but by the block. The access method to the subchannel memory is also different. The device number is first set in the B-register 103 and is then shifted to the right by 3 bits at the shifter 106 since the BMC channel is used; it is then sent to the ALU 101. At the ALU 101, the device number is subjected to address conversion as shown in FIG. 3 and is then sent to the MAR 2-3 via Z-register 104 and B-register 103. Thereby, the first access is made to the assign table. The contents of the assign table are sent to the ALU 101 through ECC circuit 2-1, MDR 2-2, gate 107 and A-register 102. At the ALU, the content is checked to see whether or not it is larger than "0001000" and the output of the ALU 101 is also checked by "all zero check" circuit 109 to see whether or not it is all "0". If the content of the assign table is all "0", it means that the UCW domain is not assigned to a specific device (more accurately, for a group of 8 devices including the specific device). Therefore, in this case, assignment of the UCW domain is to be first performed, and this is effected by issuing a signal to the instruction control section (for example, program counter) conventionally found in the central processing unit. The assign table address in B register 103 is temporarily saved transfer to and storage in the local storage 110 via ALU 101, Z-register 104 and D-register 105. Thereafter, the assign counter domain is read out. The address of the assign counter domain is the previously determined fixed address. Then the value of the assign counter is set in MDR 2-2 and the previously saved assign table address is set in MAR 2-3 via the B-register 103; thereby the value of the assign counter is written into the assign table. Thus, the assignment of the UCW domain for the group of 8 devices, including the specific device, is completed. Succeedingly, saving or reading of the UCW domain is performed for the specific device or the other 7 devices which can be used in the group of the specific device in a manner to be described below.

The following discussion is directed only to the case where the content read out from the assign table is "0001000". This indicates access to the UCW domain of the second group mentioned in this specification. At this time, the data (that is, the device number itself) being output to the Z-register 104 from the ALU 101 is again input to the ALU 101 via A-register 102 and the address is obtained by the method as shown in FIG. 6. Thus, access is made to the desired UCW via Z-register 104, B-register 103 and MAR 2-3.

The following is a discussion of how access is carried out when the content read out from the assign table is smaller than "0001000" and indicates not all "0". This is the access to the UCW domain of the third group previously mentioned. In this case, the corresponding byte paired with the byte on the assign table which has been accessed is also continuously read out, and both bytes are subject to the deformation processing, as shown in FIG. 7, at the ALU 101 and are in turn used for accessing the UCW domain.

The bytes forming a pair on the assign table include the byte of odd number from the left and the next byte, as shown in FIG. 4. On the other hand, the assign table is accessed by using the bits obtained by ignoring the lower three digits from the 4 bits of the device number. Therefore, the odd side and even side among the paired bytes of the read out byte are different when the device number is given as "0 to 7" relative to that when it is given as "8 to F". Therefore, when the odd bytes are first read out, the next byte has to be read out, while when the even bytes are first read out, the one byte just before must be read out. These controls are also performed at the ALU 101.

The gate 108, provided at the output side of gate 107 and A-register 102, is to be used for the byte selection. Namely, in this embodiment, the memory 2 can be read out or written in a unit of 8 bytes. The bytes among them which are selected and gated into ALU 101 are determined by the lower bits 29 to 31 in the B-register 103.

Figure 10:
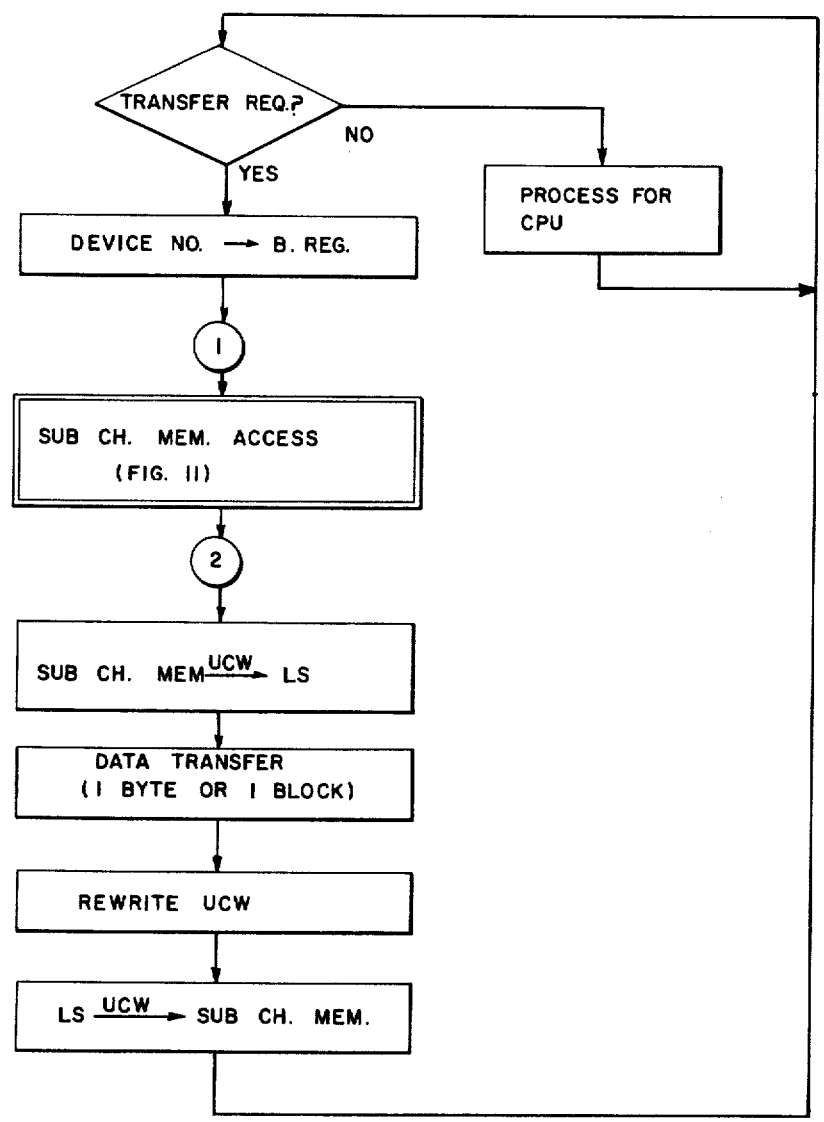
FIG. 10 shows a flow-chart which describes the operation of the embodiment shown in FIG. 9.
Figure 11:
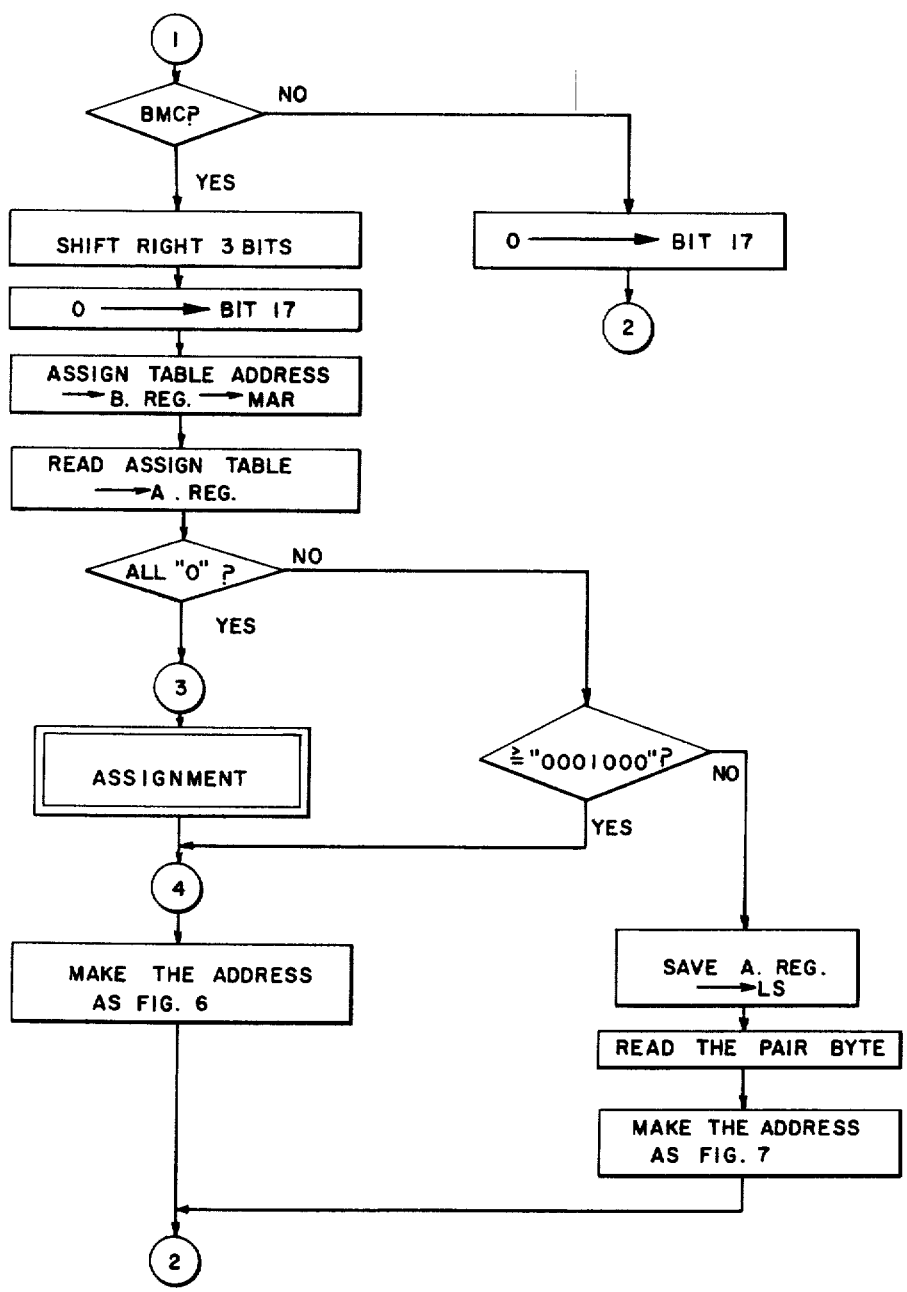
FIG. 11 shows a flow-chart which describes the operations in the sub-channel memory access shown in the FIG. 10 flow-chart.
Figure 12:
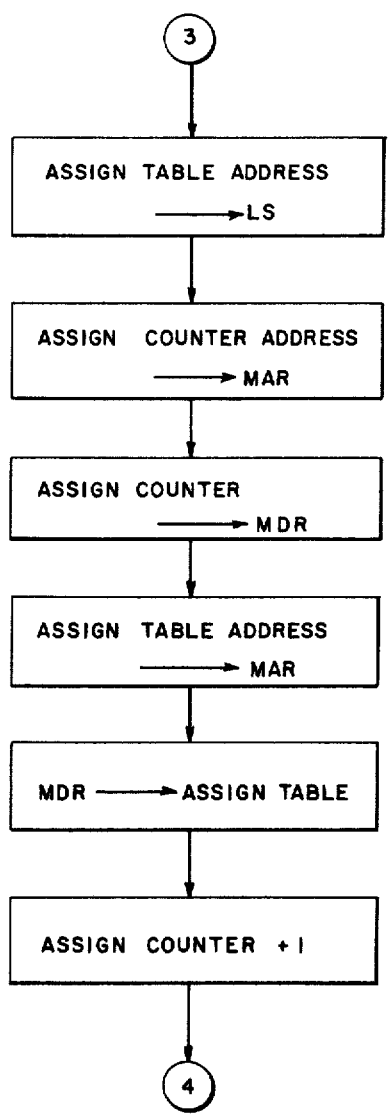
FIG. 12 shows a flow-chart which describes the assignment operations between points 3 and 4 of FIG. 11.

Now, the system operation is explained roughly referring to the FIGS. 10, 11, 12.

The CPU processes its own programs, and when the data transfer request is generated by some devices or by the program, the device number to which or from which the data should be transfered from or to the main memory is set in the register B. Then, the access to the subchannel memory is made by utilizing the device number, the UCW is loaded into the local storage, and the data transfer is executed according to the UCW.

After transferring one byte or one block, the UCW is rewritten; for example, the number of bytes to be transferred is decreased, and restored in the subchannel memory.

Thereafter, the next data transfer of another device or the next processing for the CPU is executed.

The access to the subchannel memory is explained by referring to FIG. 11. In the case of MXC, "0" is put in the 17th bit of the device number, and the access to the subchannel memory is made by using said device number directly. In case of BMC, at first, the access is made to the assign table, and the address information read out is checked. When the address information is all zero, it means that the assignment to the relevant device is not yet performed and the relevant device belongs to the second group. Therefore, the assignment is carried out.

When the address information is greater than or equal to "0001000", it means the relevant device belongs to the second group, and the assignment has been already done. Therefore, the access to the sub channel memory is carried out by developing the address from the address information as shown in FIG. 6. When the address information is not zero and less than "0001000", it means that the relevant device belongs to the third group. Therefore, the address information is at once saved in the local storage, the second address information which is the other half of the pair bytes is read out, the address is developed by combining the saved address information and the second information as shown in FIG. 7, and the access to subchannel memory is carried out.

The assignment operation is shown in FIG. 12. First, the assign table address is saved by storage in local storage, the assign counter address is set in the MAR register, the assign counter is accessed, the counted value is read out to the MDR register, the assign table address is reset to the MAR register, and the contents of the MDR register are stored in the memory area designated by said assign table address. Thereafter, the assign counter is increased for one.

As explained above, according to the present invention, the input/output control unit associated with the second group and/or the third group can access the unit control word memory domains of the second group and/or third group by a single indexing of the assign table memory domain. In addition to this, unit control word memory domains from a pool of such domains of the second group can be used on an "unshared" basis by the input/output control units of the second group which operate on a "time-shared" basis. Furthermore, unit control word memory domains can also be used in common or on a "shared basis" by several input/output devices of the third group which do not operate on a time-shared basis.

It will be apparent that many modifications and variations may be effected without departing from the scope of the novel concept of this invention. Therefore, it is intended by the appended claims to cover all such modifications and variations which fall within the true spirit and scope of the invention.

What is claimed is:

1. In a data processing system comprising:
   a central processor,
   a plurality of input/output devices having corresponding device numbers and being of at least first and second types having corresponding first and second type data transfer characteristics,
   at least one channel of a first type adapted for transfer of data between said central processor and said first type input/output devices, and
   at least one channel of a second type adapted for transfer of data between said central processor and said second type input/output devices,
   input/output control means of a first type operatively associated with said at least one channel of said first type for controlling the transfer of data between said central processor and said plurality of input-/outut devices on a time-sharing basis, and
   input/output control means of a second type operatively associated with said at least one channel of said second type for controlling the transfer of data between said central processor and said plurality of input/output devices on a non-time-sharing basis;
   a subchannel memory access control system comprising:
   subchannel memory means for storing unit control words used for enabling said data transfer to and from corresponding ones of said input/output devices, said subchannel memory means including a plurality of first addressable unit control word memory domains each assigned to hold unit control words which indicate the corresponding ones of said first type devices to or from which data is to be transferred, and a plurality of second addressable unit control word memory domains each assigned to hold unit control words which indicate the corresponding said second type input/output control means through which data is to be transferred, and
   subchannel memory addressing means for holding address information and responsive to any given device number corresponding to a given one of said first type devices or to a given one of said second type devices for accessing corresponding said first unit control word memory domain according to the device number of said given one of said first type devices, and for accessing corresponding said second unit control word memory domain according to the device number of said given one of said second type devices.

2. In a data processing system as in claim 1, wherein said channels are a plurality of block multiplexor channels; at least one of said multiplexor channels is connected to said input/output control means of said first type and at least one of said multiplexor channels is connected to said input/output control means of said second type.

3. In a data processing system as in claim 1, wherein the value of said address information for said first unit control word memory domains is outside of a predetermined range, and the value of said address information for said second unit control word memory domains is within said predetermined range;
   said subchannel memory addressing means providing address information according to a portion of said given device member;
   said subchannel memory addressing system further including:
   means for detecting said provided address information and determining if said value of said provided address information is within or outside said predetermined range;
   means for generating the address of said first unit control word memory domain from said provided address information and another portion of said given device number when said detecting means determines that the value of said provided address information is outside said predetermined range; and
   means for generating the address of said second unit control memory domain from said provided address information when said detecting means determines that the value of said provided address information is within said predetermined range.

4. In a data processing system as in claim 1, wherein said at least one channel of said first type is block multiplexor channel providing data transfer to and from said corresponding input/output devices relatively few blocks of data at a time.

5. In a data processing system as in claim 1, wherein said at least one channel of said second type is a block multiplexor channel providing data transfer to and from said corresponding input/output devices a relatively large number of blocks at a time.

6. In a data processing system as in claim 1, wherein said first addressable unit control word domains are each assigned to hold unit control words for a corresponding input/output device on an unshared basis.

7. In a data processing system as in claim 6, wherein said second addressable unit control domains are each assigned to hold unit control words for said input/output devices connected to said corresponding second type input/output control means on a shared basis.

8. In a data processing system as in claim 1, wherein said second addressable unit control domains are each assigned to hold unit control words for said input/output devices connected to said corresponding second type input/output control means on a shared basis.

9. In a data processing system as in claim 1, wherein said central processor provides the device number of each device of said first type which is to be time-shared for the first time, said subchannel memory access addressing means comprising assigning means for indicating that first addressable unit control word memory domain to be assigned to said each first type device to be time-shared for the first time.

10. In a data processing system as in claim 9, wherein said assigning means comprises a counter.

* * * * *

UNITED STATES PATENT AND TRADEMARK OFFICE
CERTIFICATE OF CORRECTION

PATENT NO. : 4,096,570
DATED : June 20, 1978
INVENTOR(S) : Masamichi Ishibashi et al It is certified that error appears in the above-identified patent and that said Letters Patent are hereby corrected as shown below:

Column 5, line 5, delete "output" (second occurrence).
Column 8, line 52, delete "made to".

Signed and Sealed this

Twenty-eighth Day of November 1978

[SEAL]

Attest:

RUTH C. MASON
Attesting Officer

DONALD W. BANNER
Commissioner of Patents and Trademarks